(12) United States Patent
Kimura et al.

(10) Patent No.: US 7,560,709 B2
(45) Date of Patent: Jul. 14, 2009

(54) SCANNING LASER MICROSCOPE

(75) Inventors: Hiroyuki Kimura, Hachioji (JP); Kenichi Kusaka, Hachioji (JP); Katashi Ishihara, Bethlehem, PA (US)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/011,947

(22) Filed: Jan. 30, 2008

(65) Prior Publication Data
US 2008/0185533 A1     Aug. 7, 2008

(30) Foreign Application Priority Data
Feb. 5, 2007    (JP) ............................. 2007-025782

(51) Int. Cl.
  *G01N 21/64*    (2006.01)
(52) U.S. Cl. .................................. 250/458.1
(58) Field of Classification Search ............. 250/458.1
   See application file for complete search history.

(56) References Cited

U.S. PATENT DOCUMENTS

| | | | |
|---|---|---|---|
| 4,469,946 A * | 9/1984 | Tanaka et al. | 250/373 |
| 6,844,963 B2 * | 1/2005 | Iketaki et al. | 359/368 |
| 2003/0151741 A1 | 8/2003 | Wolleschensky et al. | |
| 2004/0178356 A1 | 9/2004 | Natori | |
| 2005/0231799 A1 | 10/2005 | Kawasaki et al. | |
| 2006/0086887 A1* | 4/2006 | Nakata et al. | 250/201.3 |
| 2006/0226375 A1* | 10/2006 | Maruo | 250/458.1 |
| 2008/0085265 A1* | 4/2008 | Schneider et al. | 424/93.21 |

FOREIGN PATENT DOCUMENTS

| | | | |
|---|---|---|---|
| EP | 1308715 A1 | | 5/2003 |
| EP | 1617168 A1 | | 1/2006 |
| JP | 10-206742 A | | 8/1998 |
| JP | 2000-275529 A | | 10/2000 |
| JP | 2004-110017 A | | 4/2004 |
| JP | 2005292273 A | * | 10/2005 |
| JP | 2006-003521 A | | 1/2006 |

OTHER PUBLICATIONS

Extended European Search Report dated Jun. 5, 2008, issued in a counterpart European Application.

* cited by examiner

*Primary Examiner*—Constantine Hannaher
(74) *Attorney, Agent, or Firm*—Frishauf, Holtz, Goodman & Chick, P.C.

(57) ABSTRACT

Provided is a scanning laser microscope including a first laser light source for emitting ultrashort pulsed laser light; a scanning unit for two-dimensionally scanning the ultrashort pulsed laser light on a specimen; a second laser light source for emitting continuous laser light; an irradiation-position adjusting unit for performing two-dimensional adjustment of an irradiation position of the continuous laser light on the specimen; an objective lens for focusing the ultrashort pulsed laser light and the continuous laser light onto the specimen and for collecting fluorescence generated in the specimen; a light-detecting unit for detecting the fluorescence, which is split off from a light path between the objective lens and the scanning unit; and a continuous-laser-light switching unit for permitting radiation of the continuous laser light when the light-detecting unit is not detecting required fluorescence from the specimen on the basis of the ultrashort pulsed laser light.

8 Claims, 8 Drawing Sheets

SCANNING LASER MICROSCOPE

BACKGROUND OF THE INVENTION

1. Field of the Invention

The present invention relates to scanning laser microscopes.

This application is based on Japanese Patent Application No. 2007-025782, the content of which is incorporated herein by reference.

2. Description of Related Art

A known scanning laser microscope in the related art is provided with two scanners. One scanner is used to scan ultrashort pulsed laser light onto a specimen, and multiphoton fluorescence generated by a multiphoton-excitation effect in the specimen is observed. The other scanner is used to radiate the ultrashort pulsed laser light at a specific position on the specimen for applying a light stimulus. (For example, see Japanese Unexamined Patent Application, Publication No. 2006-3521.)

The scanning laser microscope disclosed in Japanese Unexamined Patent Application, Publication No. 2006-3521, uses the multiphoton excitation effect due to the ultrashort pulsed laser light for both observation and for light stimulus purposes. Therefore, fluorescence is generated only in the focal plane of an objective lens, where the photon density of the ultrashort pulsed laser light is high. Therefore, it is possible to acquire a clear multiphoton-fluorescence image merely by detecting the generated fluorescence with a light detector, without providing a confocal pinhole.

However, ultrashort pulsed laser light sources are extremely expensive compared to continuous laser light sources. When it is not really necessary to apply a stimulus to a region deep inside the specimen, even a low-cost continuous laser light source is adequate, and the versatility in stimulation applications is high. Therefore, one approach that has been considered is to perform fluorescence observation with ultrashort pulsed laser light and to use continuous laser light as stimulus laser light. With this approach, however, the continuous laser light excites autofluorescent materials disposed in the light path along which the continuous laser light travels, thus producing autofluorescence. Therefore, there is a drawback in that the autofluorescence intrudes into the multiphoton-fluorescence image acquired for observation. For example, autofluorescence is produced not only from positions outside the focal plane of the specimen that are irradiated by the continuous laser light, but also from glasses used in optical components such as lenses through which the continuous laser light passes. As a result, there is a problem in that it is not possible to acquire a clear multiphoton-fluorescence image.

BRIEF SUMMARY OF THE INVENTION

The present invention provides a scanning laser microscope which can acquire a bright, clear multiphoton-fluorescence image containing no autofluorescence, while applying a stimulus with continuous laser light.

A first aspect of the present invention is a scanning laser microscope including a first laser light source configured to emit ultrashort pulsed laser light; a scanning unit configured to two-dimensionally scan the ultrashort pulsed laser light emitted from the first laser light source on a specimen; a second laser light source configured to emit continuous laser light; an irradiation-position adjusting unit configured to perform two-dimensional adjustment of an irradiation position, on the specimen, of the continuous laser light emitted from the second light source; an objective lens configured to focus the ultrashort pulsed laser light and the continuous laser light onto the specimen and to collect fluorescence generated in the specimen; a light-detecting unit configured to detect the fluorescence, which is split off from a light path between the objective lens and the scanning unit; and a continuous-laser-light switching unit configured to permit radiation of the continuous laser light from the second laser light source when the light-detecting unit is not detecting required fluorescence from the specimen on the basis of the ultrashort pulsed laser light from the first laser light source.

According to the first aspect of the present invention, by operating the scanning unit to two-dimensionally scan the ultrashort pulsed laser light emitted from the first laser light source and by focusing the light on the specimen via the objective lens, multiphoton fluorescence due to a multiphoton excitation effect is generated at two-dimensional positions on the specimen. The generated multiphoton fluorescence is collected by the objective lens, is split into a light path before returning to the scanning unit, and is detected by the light-detecting unit. Accordingly, it is possible to acquire a two-dimensional multiphoton-fluorescence image over the focal plane of the objective lens on the basis of the scanning position of the scanning unit and intensity information of the multiphoton fluorescence detected by the light-detecting unit.

On the other hand, the continuous laser light emitted from the second laser light source is focused to a desired position on the specimen by the objective lens, with the two-dimensional irradiation position on the specimen being adjusted by operating the irradiation-position adjusting unit, so that a light stimulus can be applied to that position. In other words, changes in the specimen due to the light stimulus from the continuous laser light can be observed in the multiphoton fluorescence image.

In this case, according to the first aspect of the present invention, by operating the-continuous-laser light switching unit, the radiation of continuous laser light from the second laser light source is permitted when the required multiphoton fluorescence from the specimen on the basis of the ultrashort-pulsed laser light is not being detected, and is prohibited when the required multiphoton fluorescence is being detected. As a result, because introduction of the continuous laser light to optical components or the specimen is prohibited in the period where the multiphoton fluorescence is being detected by the light-detecting unit, thus not producing any autofluorescence, it is possible to acquire a clear multiphoton-fluorescence image. In particular, detecting the multiphoton fluorescence that is split off from the light path between the objective lens and the scanning unit with the light-detecting unit realizes a configuration in which all of the multiphoton fluorescence generated in the specimen is detected without being obstructed by a pinhole or the like, and is thus not influenced by autofluorescence. Therefore, it is possible to acquire a clear, bright multiphoton-fluorescence image.

In the first aspect described above, the light-detecting unit may detect the required fluorescence while the scanning unit scans the ultrashort pulsed laser light in one direction and not detect the required fluorescence in a retrace period.

By doing so, brightness information of the multiphoton fluorescence for constructing a multiphoton fluorescence image is acquired in the period where the scanning unit is scanning the ultrashort pulsed laser light in one direction, and light stimulation is performed by the continuous laser light during a retrace period where the brightness information is not acquired. As a result, brightness information of the multiphoton fluorescence for constructing a multiphoton fluorescence image is not acquired while autofluorescence is generated by irradiation with the continuous laser light, and it is thus possible to avoid the problem of the multiphoton fluorescence image becoming unclear due to the intrusion of autofluorescence.

In the first aspect described above, the light-detecting unit may not detect the required fluorescence when a scanning position of the scanning unit is located outside an observation area on the specimen.

In the scanning laser microscope, the scanning unit is operated within a region outside the observation area in order to make the scanning speed of the laser light uniform in the observation area. In particular, when the scanning unit is a galvanometer mirror, the galvanometer mirror is rotated as far as the region outside the observation area. In such an overscan region outside the observation area, either the ultrashort-pulsed laser light is blocked so as not to detect the multiphoton fluorescence or detection of the multiphoton fluorescence by the light-detecting unit is stopped. Therefore, by performing light stimulation with the continuous laser light in this overscan region, it is possible to prevent the problem of the autofluorescence intruding into the multiphoton fluorescence image.

The aspect described above may further include a pulsed-laser-light switching unit configured to switch between radiation and non-radiation of the ultrashort pulsed laser light, and the continuous-laser-light switching unit permits radiation of the continuous laser light when the ultrashort pulsed laser light is made not to irradiate the specimen by the pulsed-laser-light switching unit.

By doing so, irradiation of the specimen with the pulsed laser light is stopped by operating the pulsed-laser-light switching unit when detection of the required fluorescence is not performed. Therefore, it is possible to protect the specimen.

In the first aspect described above, the light-detecting unit may be an analog integrating light detector, and the continuous-laser-light switching unit may permit radiation of the continuous laser light during a discharging period of the light-detecting unit.

When the light-detecting unit is of the analog integration type, it alternates between a charging period where external fluorescence is integrated and a discharging period for the next integration. Therefore, the required multiphoton fluorescence is never detected during the discharging period. By doing so, by permitting radiation of the continuous laser light in the discharging period, it is possible to prevent the intrusion of autofluorescence in the multiphoton-fluorescence image. In addition, acquisition of the multiphoton fluorescence due to irradiation with the ultrashort pulsed laser light and light simulation by irradiation with the continuous laser light can be made close together, which enables the synchronicity to be increased.

In the first aspect described above, the light-detecting unit may include a photomultiplier tube, and a blocking mechanism configured to block incident light on the light-detecting unit when the continuous-laser-light switching unit permits radiation of the continuous laser light may be provided between the objective lens and the light-detecting unit.

With this configuration, by operating the blocking mechanism, the light is blocked from being incident on the light-detecting unit when the continuous laser light is being emitted.

Because the multiphoton excitation fluorescence for performing observation is extremely weak, in some cases the intensity of the autofluorescence and reflected light due to the continuous laser light for stimulation is extremely high in comparison. As a result, if autofluorescence which is much stronger than the fluorescence from the specimen (several thousand times higher to several tens of thousands of times higher, or more) is incident on the light-detecting unit formed of the photomultiplier tube, even during the period where the multiphoton fluorescence should be detected, an after-pulse (noise component) from the photomultiplier tube caused by the autofluorescence received in a period outside of that period coexists, and hence, a signal that differs from the multiphoton fluorescence signal is detected.

According to the first aspect of the present invention, when the continuous laser light is emitted, producing autofluorescence, because the incidence of light to the light-detecting unit is blocked by operating the blocking mechanism, the generation of an after-pulse can be suppressed, and it is thus possible to acquire a clear multiphoton-fluorescence image in which no autofluorescence coexists.

In the first aspect described above, the light-detecting unit may include a photomultiplier tube and a control unit configured to control a driving voltage of the photomultiplier tube, and the control unit may control the driving voltage so as to drive the photomultiplier tube when the continuous-laser-light switching unit prohibits radiation of the continuous laser light on the specimen.

With this configuration, even if extremely strong autofluorescence generated by emitting the continuous laser light is incident on the light-detecting unit, the driving of the photomultiplier tube is stopped by the operation of the control unit when it is incident. Therefore, the generation of an after-pulse can be suppressed, and it is thus possible to acquire a clear multiphoton-fluorescence image in which no autofluorescence coexists.

A second aspect of the present invention is an observation method for observing, as an observation target, a specimen in which Channelrhodopsin-2 is genetically introduced, using the scanning laser microscope of the first aspect described above, the method comprising irradiating the Channelrhodopsin-2 with the continuous laser light emitted from the second laser light source.

Until now, stimulation of living cells, particularly nerve cells, has mainly been performed by patch clamping or by using caged glutamic acid. Recently, however, Channelrhodopsin-2 which combines the functions of a light sensor and an ion channel, has become known. Because Channelrhodopsin-2 (a photosensitive ion channel) has the ability to give off ions in response to light, by radiating stimulus light at a desired position of an observation sample into which Channelrhodopsin-2 is genetically introduced in advance, it is possible to apply an electrical stimulus to the desired position. Continuous laser light is more suitable than ultrashort pulsed laser light as the light used to stimulate the Channelrhodopsin-2. Thus, by using the continuous laser light from the second laser light source in the first aspect described above to stimulate the Channelrhodopsin-2, it is possible to eliminate the influence of autofluorescence, thus enabling a superior observation image to be acquired.

The present invention affords an advantage in that it is possible to acquire a bright, clear multiphoton-fluorescence image containing no autofluorescence, while applying a stimulus with continuous laser light.

DETAILED DESCRIPTION OF THE INVENTION

A scanning laser microscope 1 according to an embodiment of the present invention is described below with reference to FIGS. 1 to 10.

Figure 1:
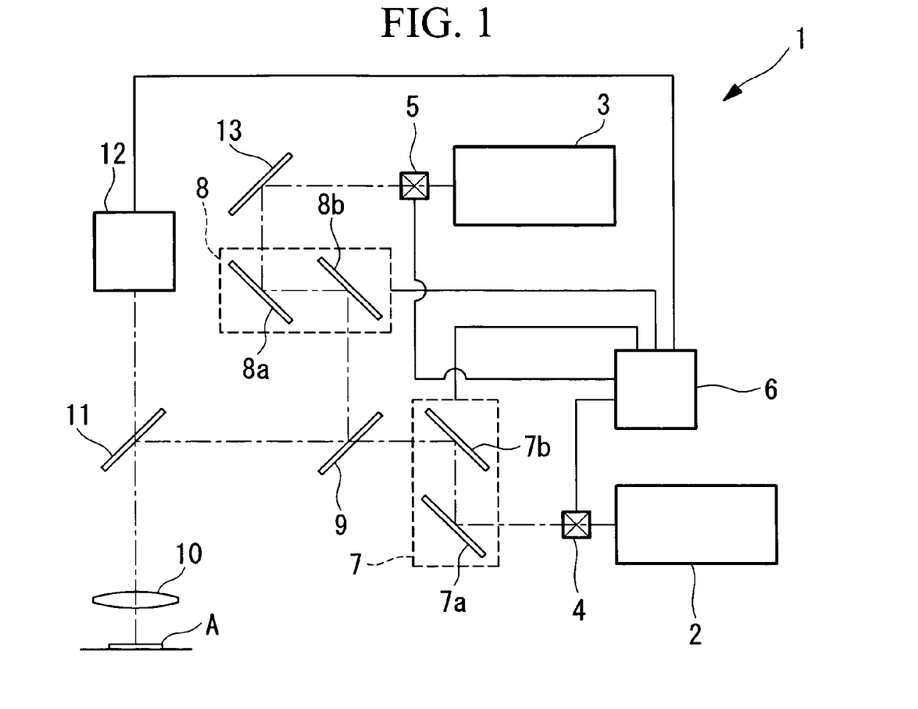
FIG. 1 is a block diagram showing the overall configuration of a scanning laser microscope according to an embodiment of the present invention.

As shown in FIG. 1, the scanning laser microscope 1 according to this embodiment includes a first laser light source 2 for emitting ultrashort-pulsed laser light and a second laser light source 3 for emitting continuous laser light. A shutter 4 (pulsed-laser-light switching unit) and a shutter 5 (continuous-laser-light switching unit) are provided after the laser light sources 2 and 3, respectively.

The first laser light source 2 can selectively emit infrared pulsed laser light in a wavelength range of 820 to 1000 nm, for example.

The second laser light source 3 emits continuous laser light having wavelength of 405 nm, for example.

The shutters 4 and 5 are formed of acousto-optic devices such as AOMs or AOTFs, or electro-optic devices.

The shutters 4 and 5 are connected to a control unit 6. The control unit 6 controls the shutters 4 and 5 on and off in synchronization with the irradiation timing of a specimen A with the laser light from the first and second light sources 2 and 3, respectively.

The scanning laser microscope 1 according to this embodiment also includes a first scanner (scanning unit) 7 for two-dimensionally scanning the ultrashort-pulsed laser light emitted from the first laser light source 2 and a second scanner (irradiation-position adjusting unit) 8 for two-dimensionally adjusting the irradiation position of the continuous laser light emitted from the second laser light source 3.

The first scanner 7 is formed, for example, of a pair of galvanometer mirrors 7a and 7b, and the second scanner 8 is formed of a pair of galvanometer mirrors 8a and 8b.

The first scanner 7 is configured so as to be driven in a raster scanning mode by changing the rotation angles of the galvanometer mirrors 7a and 7b. Thus, it is possible to two-dimensionally scan the ultrashort pulsed laser light on the specimen A.

The second scanner 8 is configured so as to be capable of two-dimensionally adjusting, or scanning, the irradiation position of the continuous laser light on the specimen A by changing the rotation angles of the galvanometer mirrors 8a and 8b.

The scanning laser microscope 1 according to this embodiment also includes a first dichroic mirror 9 for combining the ultrashort-pulsed laser light and the continuous laser light onto the same optical path; an objective lens 10 for focusing the ultrashort-pulsed laser light and the continuous laser light onto the specimen A, as well as for collecting fluorescence generated in the specimen A; a second dichroic mirror 11 for splitting off the fluorescence collected by the objective lens 10 from the light path; and a light detector 12 for detecting the fluorescence split off by the second dichroic mirror 11.

The first dichroic mirror 9 has a transmittance characteristic whereby it transmits the ultrashort-pulsed laser light in the wavelength range mentioned above and reflects the continuous laser light with the wavelength mentioned above. The second dichroic mirror 11 has a transmittance characteristic whereby it reflects the laser light from the first and second laser light sources 2 and 3 and transmits the fluorescence from the specimen A.

The light detector 12 is formed, for example, of a photomultiplier tube. Reference numeral 13 in the drawing is a mirror.

The control unit 6 is connected to the first and second scanners 7 and 8 and the light detector 12 to control them.

As shown in FIGS. 2 to 7, the control unit 6 controls the shutters 4 and 5 on and off in four modes so as to radiate the ultrashort-pulsed laser light for observation and the continuous laser light for light stimulation.

Figure 2:
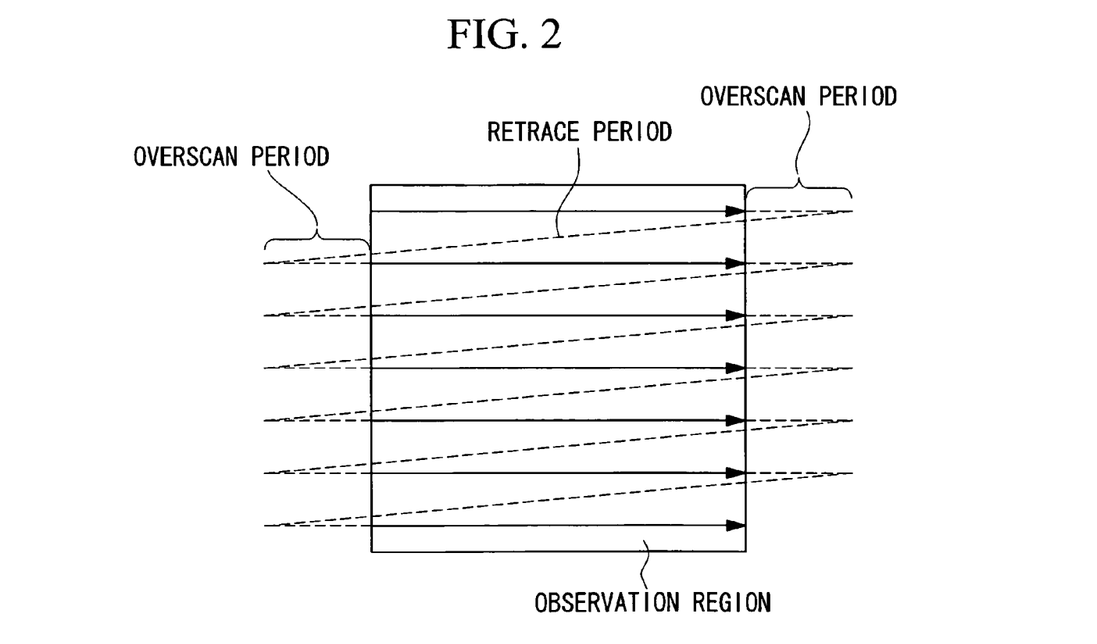
FIG. 2 is a diagram showing a scanning pattern of laser light in a first mode of the scanning laser microscope in FIG. 1.
Figure 3:
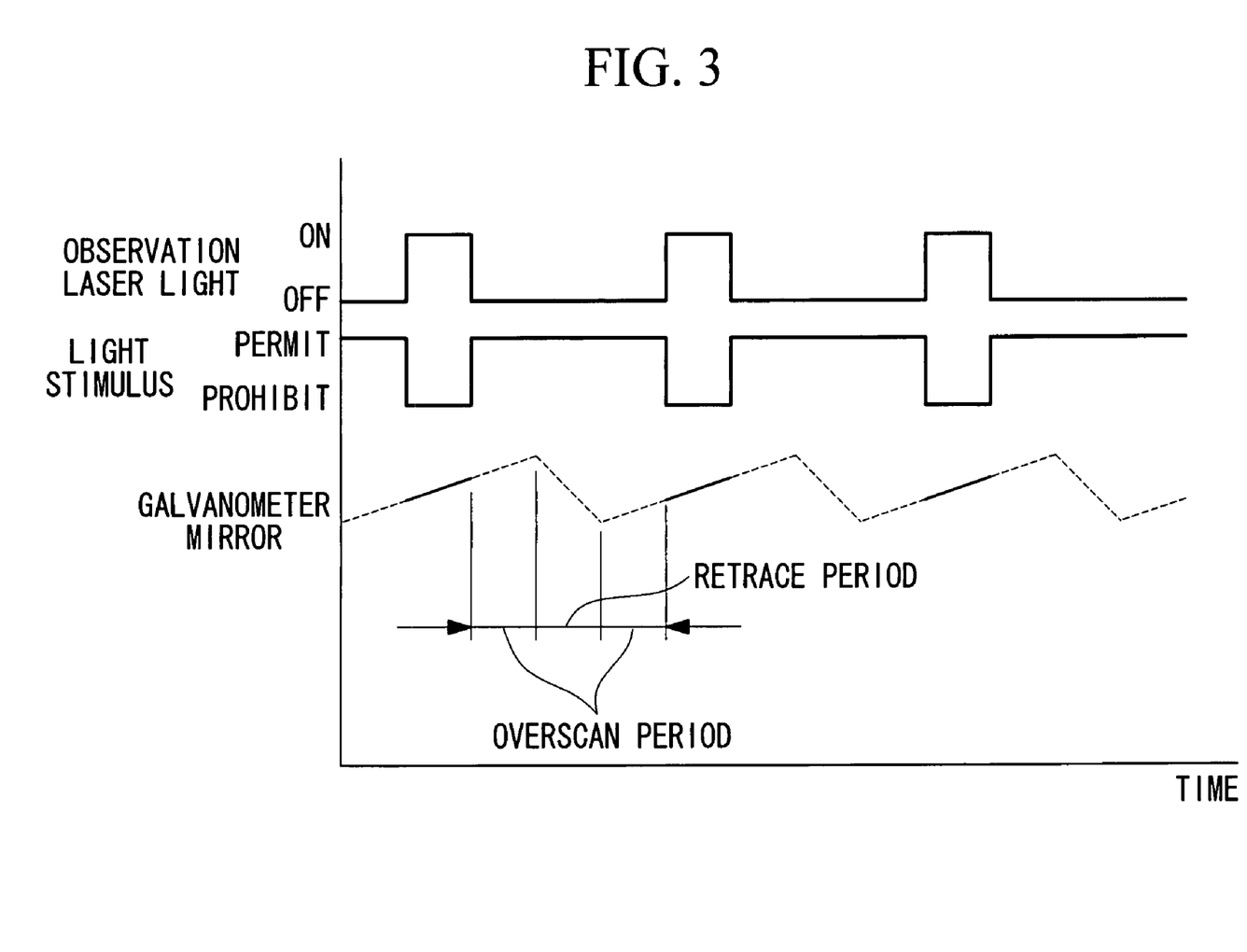
FIG. 3 is a timing chart for the scanning pattern in FIG. 2.

As shown in FIGS. 2 and 3, in the first mode, the shutter 4 is controlled on and off so that the specimen A is irradiated with the ultrashort-pulsed laser light while a desired observation area is scanned in one direction (the periods indicated by the arrows shown with solid lines in FIG. 2), and so that the specimen A is not irradiated with the ultrashort-pulsed laser light in a region extending outside the observation area (overscan period) and in a retrace period where it is scanned in the opposite direction (the periods shown by the broken lines in FIG. 2).

In this first mode, the shutter 5 is controlled on and off so that the specimen A is irradiated with the continuous laser light for light stimulation at all points in the period during which irradiation of the specimen A with the ultrashort-pulsed laser light is blocked by turning the shutter 4 off (the overscan period and the retrace period).

Figure 4:
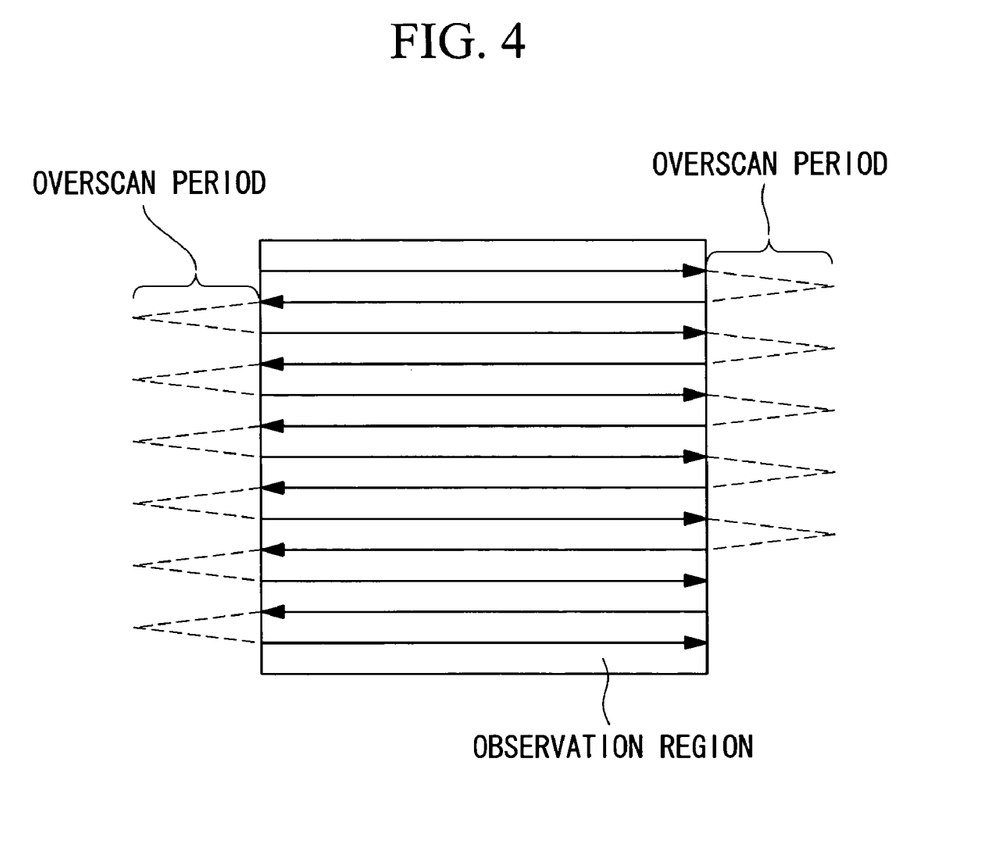
FIG. 4 is a diagram showing a scanning pattern of laser light in a second mode of the scanning laser microscope in FIG. 1.
Figure 5:
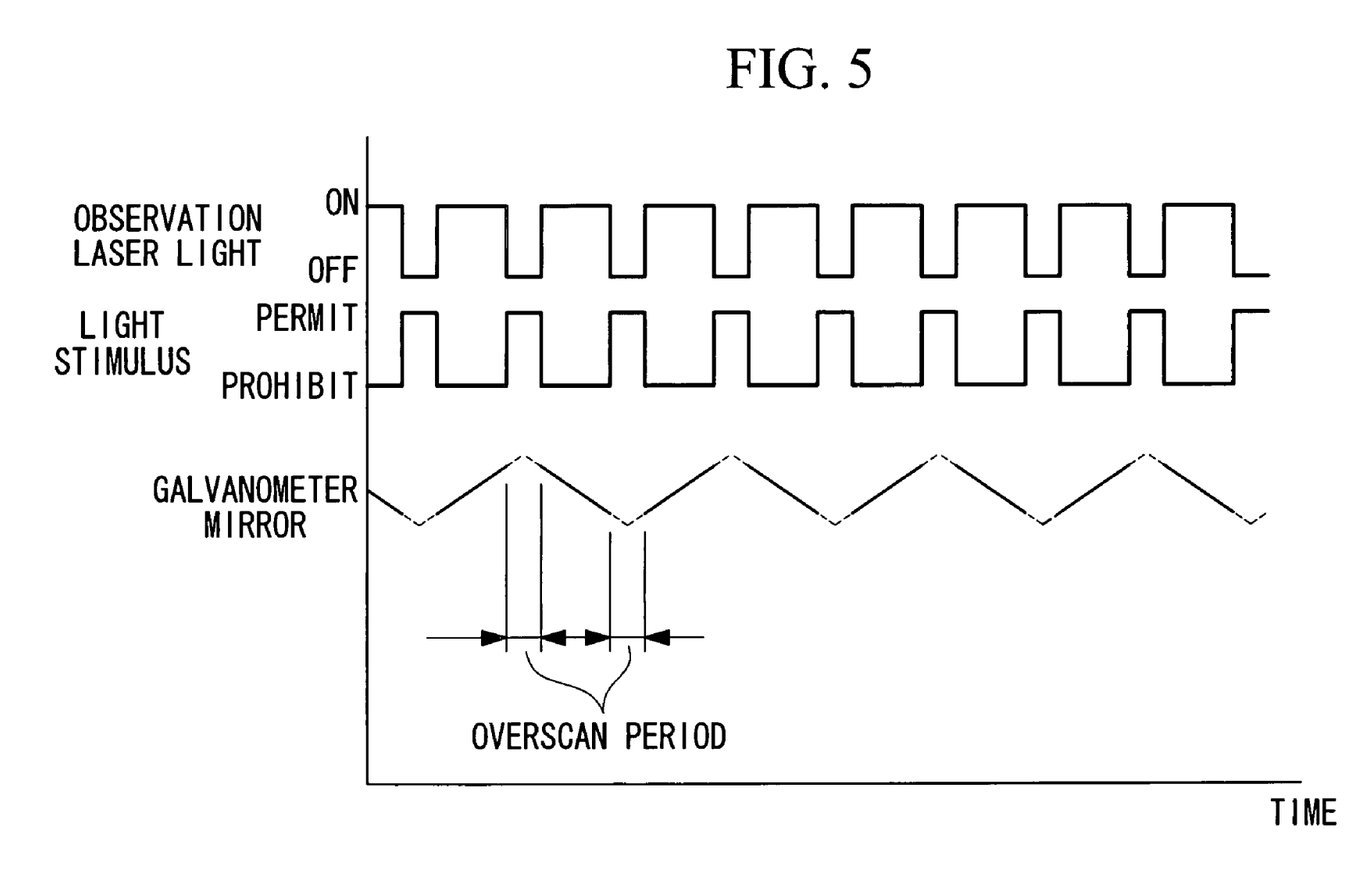
FIG. 5 is a timing chart for the scanning pattern in FIG. 4.

As shown in FIGS. 4 and 5, in the second mode, the shutter 4 is controlled on and off so that the specimen A is irradiated with the ultrashort pulsed laser light while the desired observation area is scanned in both directions (the period indicated by the arrows shown in solid lines in FIG. 4), and so that the specimen A is not irradiated with the ultrashort-pulsed laser light in regions extending outside the observation area (the overscan period, shown with broken lines in FIG. 4). In this second mode, the shutter 5 is controlled on and off so that the specimen A is irradiated with the continuous laser light for light stimulation at all points in the period during which irradiation of the specimen A with the ultrashort-pulsed laser light is blocked by turning the shutter 4 off (the overscan period).

Figure 6:
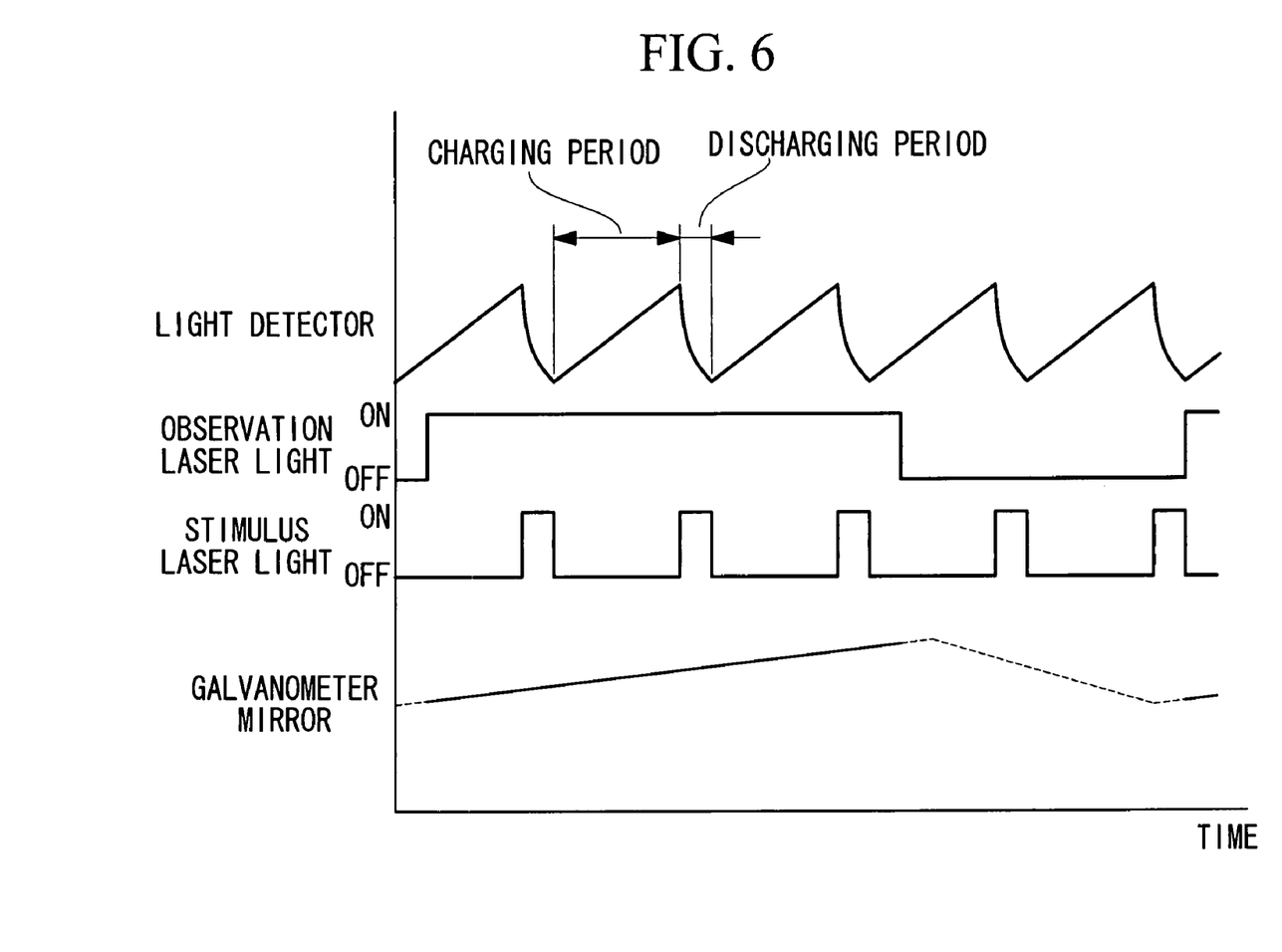
FIG. 6 is a timing chart showing a scanning pattern of laser light in a third mode of the scanning laser microscope in FIG. 1.

In the third mode, the desired observation area is scanned in one direction, similarly to the first mode. In the third mode, however, the specimen A is irradiated with the continuous laser light for light stimulation in a period during which the specimen A is irradiated with the ultrashort pulsed laser light.

More specifically, as shown in FIG. 6, the photomultiplier tube constituting the light detector 12 alternates between a charging period where the electrical charge due to the fluorescence is integrated and a discharging period where the electrical charge is discharged for the next integration. Therefore, the fluorescence from the specimen is detected only during the charging period, but it is not detected during the discharging period even when multiphoton fluorescence is generated in the specimen A by irradiating it with the ultrashort pulsed laser light. Thus, in the third mode, the shutter 5 is controlled on and off so that the specimen A is irradiated with the continuous laser light in this discharging period.

Figure 7:
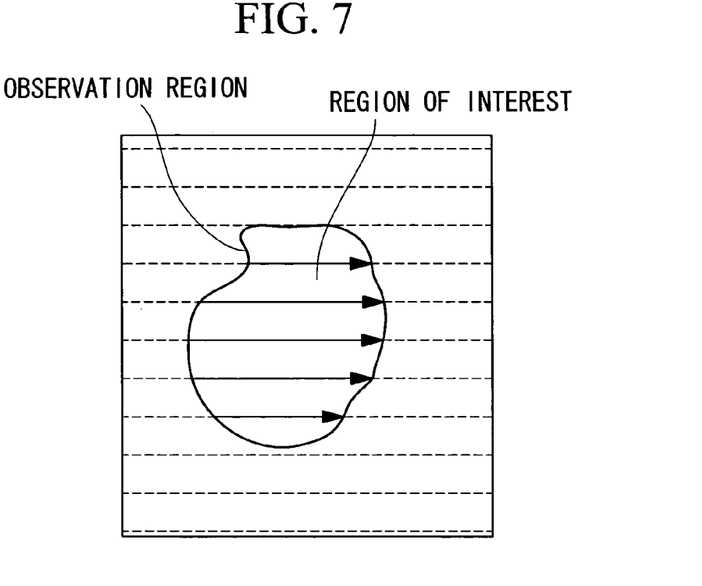
FIG. 7 is a diagram showing a scanning pattern of laser light in a fourth mode of the scanning laser microscope in FIG. 1.

As shown in FIG. 7, in the fourth mode, when acquiring a multiphoton fluorescence image of only a desired region of interest (ROI, shown by solid lines), the shutter 5 is controlled on and off so that the specimen A is irradiated with the continuous laser light while the first scanner 7 is scanning outside that region (the periods shown by the broken lines in FIG. 7). In areas outside the region of interest, the shutter 4 is turned off to prohibit irradiation of the specimen A with the ultrashort pulsed laser light.

The operation of the scanning laser microscope 1 according to this embodiment, configured in this way, will be described below.

To perform fluoroscopy of the specimen A using the scanning laser microscope 1 according to this embodiment, the first laser light source 2 is operated to emit ultrashort pulsed laser light, the shutter 4 is controlled on and off, and the first scanner 7 is operated to scan the ultrashort pulsed laser light on the specimen A. In other words, the ultrashort pulsed laser light emitted from the first laser light source 2 is two-dimensionally scanned by the first scanner 7 and is transmitted through the first dichroic mirror 9, and after being reflected by the second dichroic mirror 11, it is focused onto the specimen A by the objective lens 10.

At the focal plane of the objective lens 10, the photon density of the ultrashort pulsed laser light is high; thus, a fluorescent substance inside the specimen A is excited due to the generation of a multiphoton excitation effect, thus generating multiphoton fluorescence. The generated multiphoton fluorescence is collected by the objective lens 10, passes through the second dichroic mirror 11, and is detected by the light detector 12 as fluorescence intensity information.

Therefore, the irradiation position of the ultrashort pulsed laser light scanned by the first scanner 7 and the multiphoton fluorescence intensity information detected by the light detector 12 are stored in association with each other, which allows a two-dimensional multiphoton-fluorescence image to be constructed.

On the other hand, the continuous laser light emitted from the second laser light source 3 is two-dimensionally adjusted in position by the second scanner 8 and is then reflected by the first dichroic mirror 9 and the second dichroic mirror 11 and focused onto the specimen A by the objective lens 10.

Thus, it is possible to apply a light stimulus to the specimen A by irradiating it with the continuous laser light at the focal point of the objective lens 10.

In this case, with the scanning laser microscope 1 according to this embodiment, the shutters 4 and 5 are controlled on and off by operating the control unit 6, and irradiation with the continuous laser light from the second laser light source 3 is permitted when the light detector 12 is not detecting required fluorescence from the specimen A based on the ultrashort pulsed laser light from the first laser light source 2. Therefore, detection of multiphoton fluorescence based on the ultrashort pulsed laser light is not performed during the period where the continuous laser light produces autofluorescence in the objective lens 10 or the specimen A while applying a light stimulus, and the light stimulus is blocked when performing detection of the multiphoton fluorescence. Accordingly, it is possible to prevent intrusion of autofluorescence in the multiphoton fluorescence, and it is thus possible to acquire a clear multiphoton fluorescence image.

More specifically, in the first mode of the control unit 6, the ultrashort pulsed laser light is radiated onto the specimen A only when it is scanned in one direction in the observation area in the scanning path using the raster scanning method and, by turning the shutter 4 off, it is not radiated outside this region, that is, in the overscan period and the retrace period. Therefore, it is possible to apply a light stimulus during that period by irradiating the continuous laser light, which enables acquisition of a clear multiphoton fluorescence image.

In this embodiment, non-descan detection in which the fluorescence emitted from the specimen is guided to the light detector 12 without returning to the scanner 7, is performed to improve the signal-to-noise (S/N) ratio of the fluorescence detection. In non-descan detection, it is not possible to use a confocal pinhole; however, because the fluorescence due to multiphoton excitation is generated only in the vicinity of the position where the laser light is converged (focus position), it is possible to acquire an optical cross-sectional image of the specimen, even without a confocal pinhole.

In this embodiment, the continuous laser light is used as the stimulus light. Short-wavelength light such as visible light of 450 nm or less, from blue to violet, or ultraviolet light below 400 nm is often used as the stimulus light. Light in this wavelength range easily produces autofluorescence in the optical system (glasses). Because the autofluorescence produced cannot be blocked at a barrier filter for fluorescence detection whose wavelength range is close to the fluorescence due to the multiphoton excitation, and because there is no confocal pinhole in the detection system, the autofluorescence produced in the detection light path intrudes into the detector unless measures are taken.

According to this embodiment, the stimulus laser light is radiated in a period during which the multiphoton excitation fluorescence for observation is not detected; therefore, even though autofluorescence is produced, it has no influence on the detection of the multiphoton excitation fluorescence.

In the second mode of the control unit 6, the ultrashort pulsed laser light is radiates onto the specimen A while scanning the observation area in the scanning path in both directions, using the raster scanning method, and in the overscan period outside this period, it is not radiated because the shutter 4 is turned off. Therefore, the continuous laser light is radiated during that period to apply a light stimulus, and it is thus possible to acquire a clear multiphoton-fluorescence image. In this case, because the multiphoton fluorescence from the specimen A is detected while scanning in both directions, an advantage is afforded in that it is possible to acquire a multiphoton-fluorescence image rapidly and with high resolution.

In the third mode of the control unit 6, the ultrashort pulsed laser light is radiates onto the specimen A only while scanning the observation area in the scanning path in one direction, using the raster scanning method; however, by turning the shutter 5 on and radiating the continuous laser light only during the discharging period in that period, it is possible to apply a light stimulus to the specimen A and to acquire a clear multiphoton-fluorescence image. In this case, it is possible to make the radiation period of the ultrashort pulsed laser light and the radiation period of the continuous laser light close to each other, which affords an advantage in that it is possible to improve the synchronization of the light stimulation and detection of the multiphoton fluorescence for observation.

In the fourth mode of the control unit 6, the ultrashort pulsed laser light is radiated onto the specimen A only in the region of interest, and in other areas, the shutter is turned off so that the ultrashort pulsed laser light is not radiated. Therefore, it is possible to radiate the continuous laser light in this period to apply the light stimulus, which enables acquisition of a clear multiphoton-fluorescence image.

Figure 8:
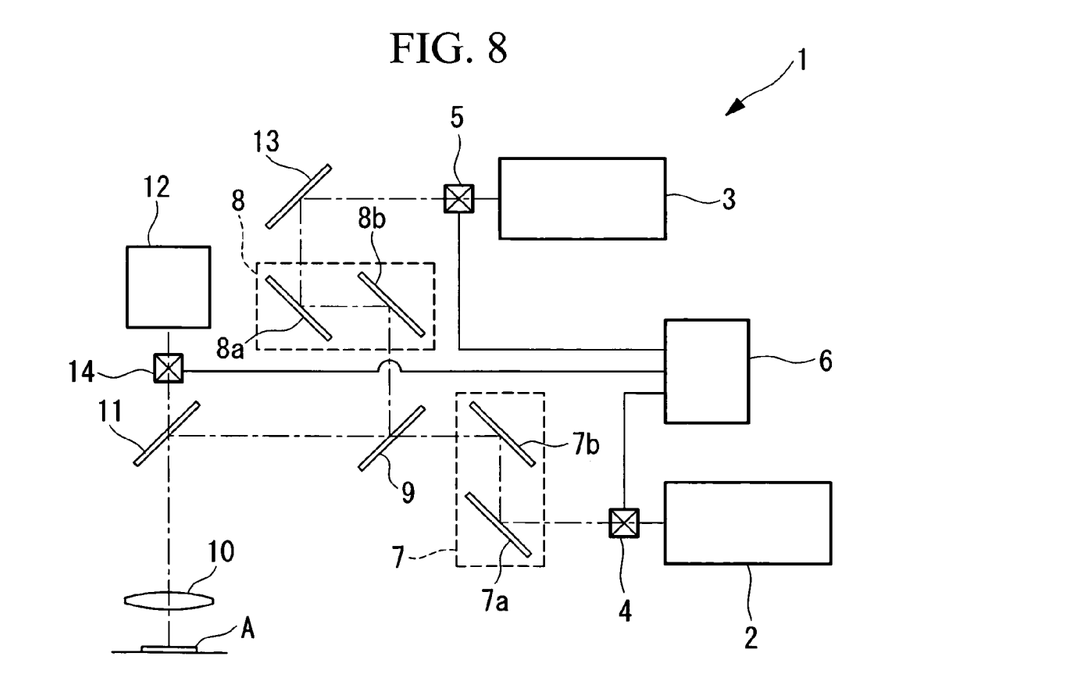
FIG. 8 is a block diagram showing a modification of the scanning laser microscope in FIG. 1.

In this embodiment, the problem of autofluorescence produced by the continuous laser light getting into the multiphoton fluorescence for observation is prevented by making the detection period of the multiphoton fluorescence different from the radiation period of the continuous laser light for light stimulation. As shown in FIG. 8, a blocking mechanism 14 which can be turned on and off may further be provided in front of the light detector 12. By doing so, it is possible to avoid the problem of after-pulses being produced in the photomultiplier tube constituting the light detector 12. An acousto-optic device or electro-optic device which can be operated on the order of microseconds is preferably used as the blocking mechanism 14, or an electromagnetic shutter may be used. A mirror which can be switched at high speed, such as a MEMS device may be used to switch the light path to the light detector 12.

Figure 9:
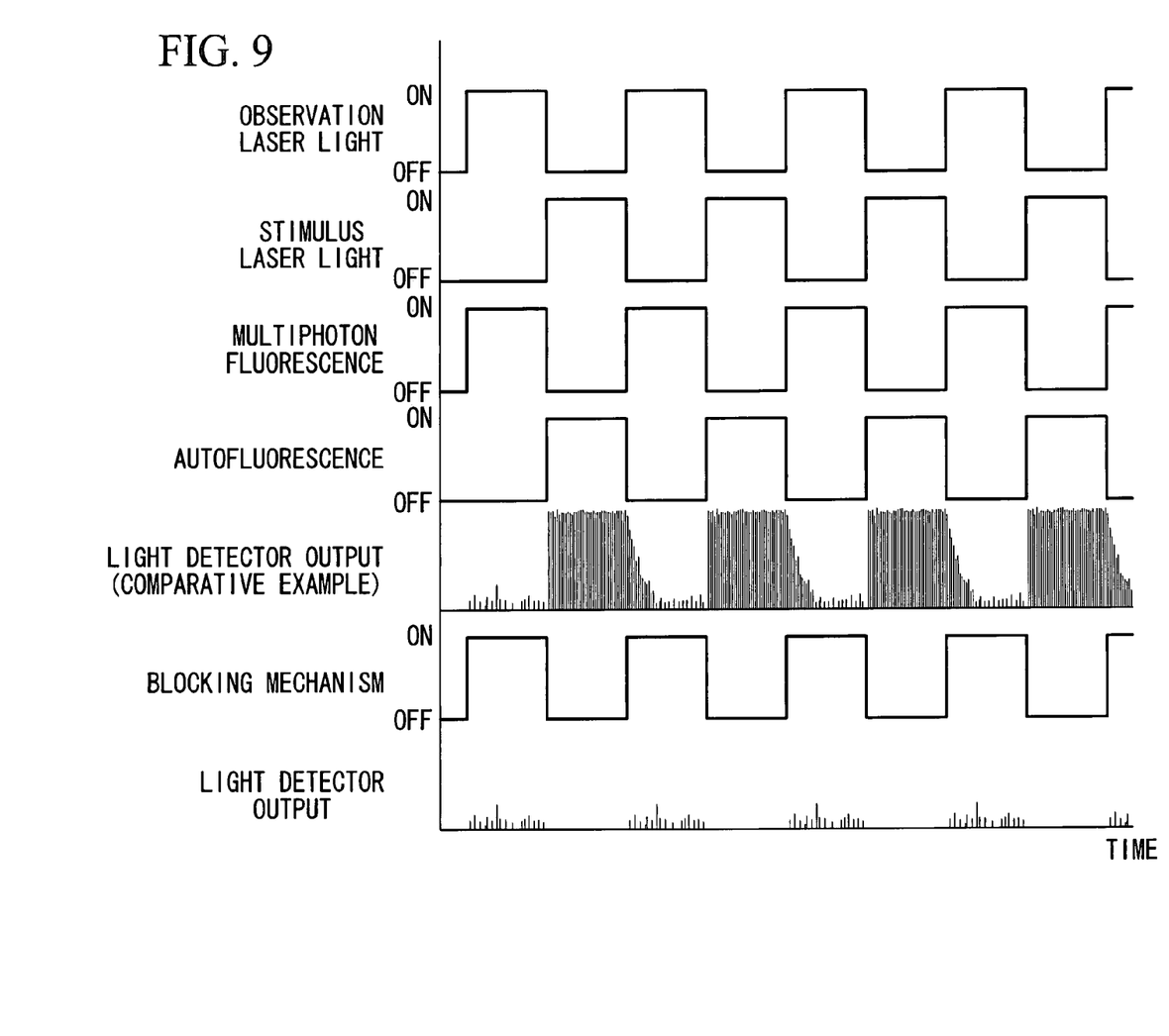
FIG. 9 is a timing chart for observation with the scanning laser microscope in FIG. 8.

In other words, when the intensity of the autofluorescence is extremely high (several thousand times greater to several tens of thousands of times greater) compared to the multiphoton fluorescence from the specimen A to be detected, as shown in the Comparative Example in FIG. 9, sometimes after-pulses ascribed to the autofluorescence also coexist in a period exceeding the period where the continuous laser light for stimulation is radiated, producing autofluorescence, where it is desired to detect multiphoton fluorescence. This causes detection of a signal different from the multiphoton fluorescence to be detected. Thus, in the period where the blocking mechanism 14 is operated and the continuous laser light is emitted, producing autofluorescence, light is blocked from traveling to the light detector 12, and light is permitted to travel to the light detector 12 only in the period where the ultrashort pulsed laser light is radiated and the multiphoton fluorescence is detected. By doing so, as shown in the lowest stage of FIG. 9, it is possible to detect a signal containing only the multiphoton fluorescence to be detected.

Figure 10:
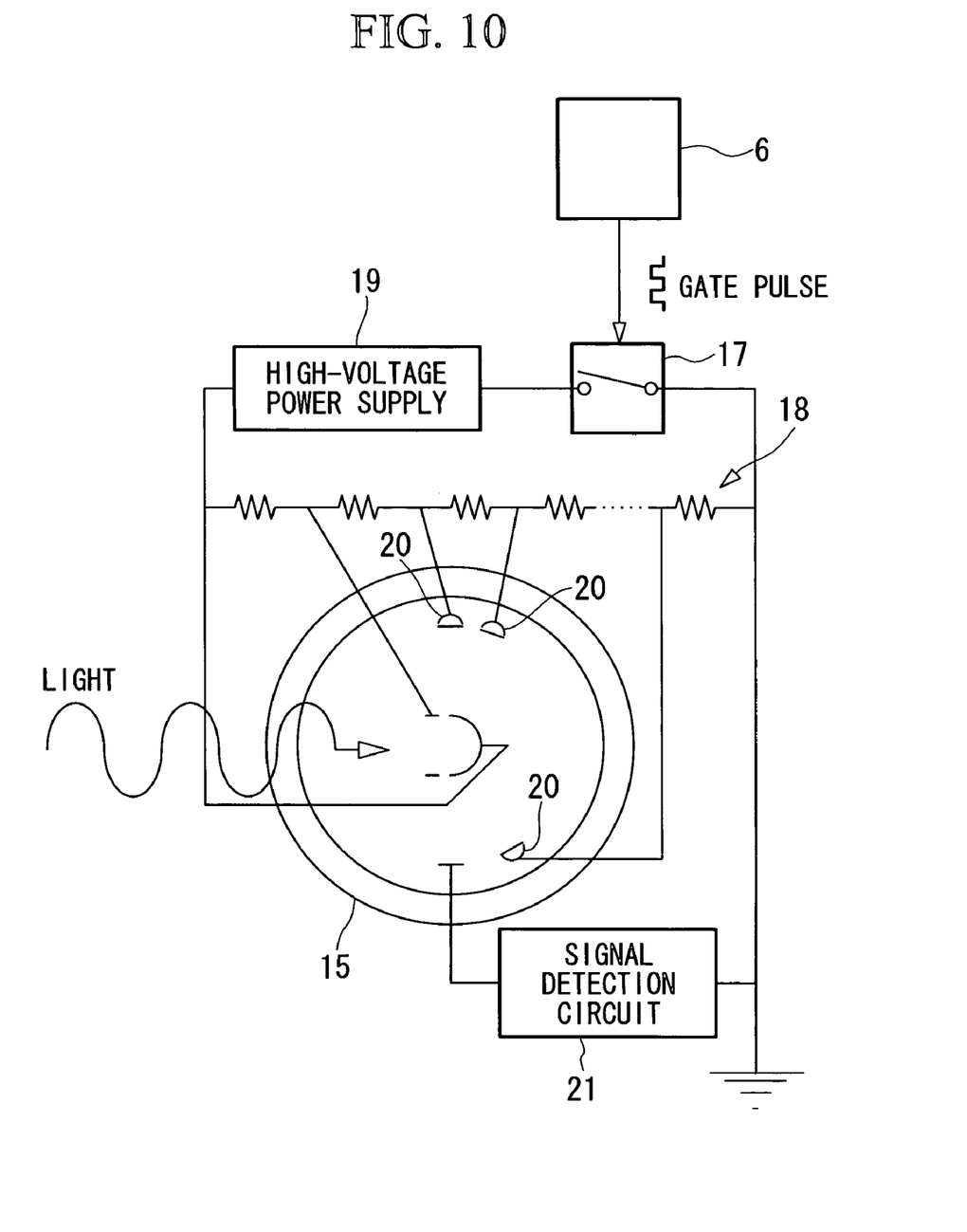
FIG. 10 is a schematic diagram showing a modification of a light detector used in the scanning laser microscope in FIG. 1.

Instead of the blocking mechanism 14, it is also acceptable to perform so-called gating, where an electrical current signal according to the intensity of the input light is output only during a required period by electrically switching the photomultiplier tube 15. FIG. 10 is a schematic diagram showing the internal configuration of the photomultiplier tube 15.

The photomultiplier tube 15 is switched between a driven state and a non-driven state by controlling a switch 17 on the basis of a gate pulse signal generated by the control unit 6. This method includes a method where the photomultiplier tube 15 is normally in the gate off state and is switched to the gate on state when the gate pulse signal is input (normally off), and a method where it is switched to the gate off state when the gate pulse signal is input (normally on).

For example, with normally-off gating, only during the period where the gate pulse signal is input from the control unit 6 and a high voltage is applied to a divider circuit 18 in the photomultiplier tube 15 from a high-voltage power supply 19, photoelectrons are multiplied at each stage of a plurality of dynodes 20 to produce secondary electrons, which are detected by a signal detection circuit 21. However, because the path of electrons traveling between the dynodes 20 is disturbed during a period where this gate pulse signal is not applied, the photoelectrons are not multiplied and the photomultiplier 15 thus does not function. The reverse is true in the case of normally-on gating.

By doing so, similarly to the case where the blocking mechanism 14 is provided, during the period where the continuous laser light is emitted, producing autofluorescence, as shown at the lowest stage in FIG. 9, it is possible to detect a signal containing only the multiphoton fluorescence to be detected by not operating photomultiplier tube 15 and by making it possible to detect the multiphoton fluorescence with the light detector 12 only during the period where the ultrashort pulsed laser light is radiated and the multiphoton fluorescence is detected.

Therefore, it is possible to acquire a clear multiphoton-fluorescence image that is not influenced at all by autofluorescence.

What is claimed is:

1. A scanning laser microscope comprising:
a first laser light source configured to emit ultrashort pulsed laser light for performing observation;
a scanning unit configured to two-dimensionally scan the ultrashort pulsed laser light emitted from the first laser light source on a specimen;
a second laser light source configured to emit continuous laser light for performing light stimulation;
an irradiation-position adjusting unit configured to perform two-dimensional adjustment of an irradiation position, on the specimen, of the continuous laser light emitted from the second light source;
an objective lens configured to focus the ultrashort pulsed laser light and the continuous laser light onto the specimen and to collect fluorescence generated, due to multiphoton excitation, in the specimen by emitting the ultrashort pulsed laser light for performing observation;
a light-detecting unit configured to detect the fluorescence, which is split off from a light path between the objective lens and the scanning unit; and
a continuous-laser-light switching unit configured to permit radiation of the continuous laser light from the second laser light source when the light-detecting unit does not detect a required fluorescence from the specimen based on the ultrashort pulsed laser light from the first laser light source.

2. A scanning laser microscope according to claim 1, wherein the light-detecting unit detects the required fluorescence while the scanning unit scans the ultrashort pulsed laser light in one direction and does not detect the required fluorescence in a retrace period.

3. A scanning laser microscope according to claim 1, wherein the light-detecting unit does not detect the required fluorescence when a scanning position of the scanning unit is disposed at a location outside an observation area on the specimen.

4. A scanning laser microscope according to claim 1, further comprising a pulsed-laser-light switching unit configured to switch between radiation and non-radiation of the ultrashort pulsed laser light,
wherein the continuous-laser-light switching unit permits radiation of the continuous laser light when the ultrashort pulsed laser light is made not to irradiate the specimen by the pulsed-laser-light switching unit.

5. A scanning laser microscope according to claim 1,
wherein the light-detecting unit is an analog integrating light detector, and
the continuous-laser-light switching unit permits radiation of the continuous laser light during a discharging period of the light-detecting unit.

6. A scanning laser microscope according to claim 1,
wherein the light-detecting unit includes a photomultiplier tube, and
a blocking mechanism configured to block incident light on the light-detecting unit when the continuous-laser-light switching unit permits radiation of the continuous laser light is provided between the objective lens and the light-detecting unit.

7. A scanning laser microscope according to claim 1, wherein the light-detecting unit includes a photomultiplier tube and a control unit configured to control a driving voltage of the photomultiplier tube, and the control unit controls the driving voltage so as to drive the photomultiplier tube when the continuous-laser-light switching unit prohibits radiation of the continuous laser light.

8. An observation method for observing, as an observation target, a specimen in which Channelrhodopsin-2 is genetically introduced, using the scanning laser microscope of claim 1, the method comprising irradiating the Channelrhodopsin-2 with the continuous laser light emitted from the second laser light source.

* * * * *